United States Patent
Nakata et al.

(10) Patent No.: US 7,947,197 B2
(45) Date of Patent: May 24, 2011

(54) MOISTURE-RESISTANT DEOXIDANT

(75) Inventors: Takashi Nakata, Tokyo (JP); Tatsuo Iwai, Ibaraki (JP); Takahiro Seki, Chiba (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 455 days.

(21) Appl. No.: 12/092,996

(22) PCT Filed: Nov. 9, 2005

(86) PCT No.: PCT/JP2005/020540
§ 371 (c)(1),
(2), (4) Date: May 8, 2008

(87) PCT Pub. No.: WO2007/055003
PCT Pub. Date: May 18, 2007

(65) Prior Publication Data
US 2009/0095941 A1    Apr. 16, 2009

(51) Int. Cl.
C09K 15/02 (2006.01)
C09K 15/06 (2006.01)

(52) U.S. Cl. ......... 252/188.28; 252/400.62; 252/182.32; 252/182.33; 252/181.6; 252/181.7

(58) Field of Classification Search ............. 252/188.28, 252/400.62, 182.32, 182.33, 181.6, 181.7
See application file for complete search history.

(56) References Cited

U.S. PATENT DOCUMENTS

| | | | | |
|---|---|---|---|---|
| 3,507,952 A | * | 4/1970 | Rednick et al. | 424/465 |
| 4,166,807 A | * | 9/1979 | Komatsu et al. | 502/62 |
| 4,205,957 A | * | 6/1980 | Fujiwara | 44/250 |
| 4,230,595 A | * | 10/1980 | Yamaji et al. | 252/188.28 |
| 5,089,323 A | * | 2/1992 | Nakae et al. | 428/220 |
| 5,378,428 A | * | 1/1995 | Inoue et al. | 422/9 |
| 5,799,463 A | * | 9/1998 | Kashiba | 53/400 |
| 6,039,892 A | * | 3/2000 | Himeshima et al. | 252/188.28 |
| 6,133,361 A | * | 10/2000 | Hatakeyama et al. | 206/524 |
| 2009/0159846 A1 | * | 6/2009 | Sugimoto et al. | 252/188.28 |

FOREIGN PATENT DOCUMENTS

| EP | 1 506 719 | 2/2005 |
|---|---|---|
| EP | 1 938 892 | 7/2008 |
| JP | 54-000476 | 1/1979 |
| JP | 02-203937 | 8/1990 |
| JP | 04-244228 | 9/1992 |
| JP | 11-033395 | 2/1999 |
| JP | 2005-319429 | 11/2005 |

OTHER PUBLICATIONS

Extended European Search Report including Supplementary European Search Report and European Search Opinion, dated Feb. 4, 2010, for Application No. EP 05 80 6175.

* cited by examiner

*Primary Examiner* — Joseph D Anthony
(74) *Attorney, Agent, or Firm* — Antonelli, Terry, Stout & Kraus, LLP.

(57) ABSTRACT

A deoxidant composition comprising 100 parts by weight of iron powder, 0.01 to 20 parts by weight of metal halide and 0.01 to 5 parts by weight of water repellent agent. The deoxidant composition even when used in a high-humidity atmosphere can maintain oxygen absorption potency. A deoxidant pack for high humidity obtained by wrapping the deoxidant composition without mixing of any inorganic filler by means of an air-permeable packaging material can reduce the apparent volume of deoxidant composition, so that the amount of packaging material used in the production of the deoxidant pack can be reduced.

8 Claims, No Drawings

MOISTURE-RESISTANT DEOXIDANT

TECHNICAL FIELD

The present invention relates to a moisture-resistant deoxidant. Precisely, it relates to an improved deoxidant composition having a large oxygen absorption capacity per the apparent volume thereof and capable of maintaining the oxygen absorption potency for a long period of time even in high-humidity conditions, and to a deoxidant pack and a deoxidation method.

BACKGROUND ART

A deoxidant relying on the oxidation reaction of iron powder has been widely used, as sealed up in a gas-barrier container along with an object such as food put therein, thereby removing the oxygen from the container so as to preserve the quality and the freshness of the object such as food. The commercially-available deoxidant relies on the reaction of iron powder with oxygen in the presence of moisture; and for promoting the oxidation reaction of iron powder, in general, a metal halide such as sodium chloride or calcium chloride and, from the viewpoint of increasing the oxygen absorption rate and amount and of the handling ability, an inorganic filler are added thereto, and the deoxidant of the type is disclosed in Patent Reference 1.
Patent Reference 1: JP-B S54-476

DISCLOSURE OF THE INVENTION

Heretofore, when a deoxidant comprising an iron powder, a metal halide and an inorganic filler is applied to food having a high moisture content and having a high moisture activity, then there is a problem in that the moisture in the food moves into the deoxidant pack and the deoxidant surface is thereby coated with water to stop the deoxidation reaction. To solve this problem, employed is a method of incorporating a large quantity of an inorganic filler such as silica or zeolite so as to disperse moisture, thereby maintaining the deoxidation potency. The potency preservability may be improved by the addition of the inorganic filler; however, there is a problem in that the apparent volume to be used of the deoxidant composition per the oxygen absorption rate increases and the size of the packaging material in producing the deoxidant pack enlarges, thereby resulting in increase in cost.

An object of the present invention is to solve the above-mentioned problems of the deoxidant in the prior art and to provide a deoxidant having a high oxygen absorption capacity per the unit volume of the deoxidant composition and capable of preserving the oxygen absorption potency for a long period of time even in high-humidity atmospheres.

The present inventors have assiduously studied in consideration of the above-mentioned problems and, as a result, have found that, when a deoxidant composition with a water repellent added thereto is used and even when used in high-humidity conditions, the moisture having penetrated into the deoxidant pack forms water droplets on the deoxidant composition, in stead of coating the deoxidant, and thereby the deoxidation potency is preserved for a long period of time, and the inventors have reached the present invention.

The present invention relates to a deoxidant composition comprising 100 parts by weight of an iron powder, from 0.01 to 20 parts by weight of a metal halide and from 0.01 to 5 parts by weight of a water repellent. The water repellent is preferably a metal soap; the metal soap is preferably an alkali metal salt of a fatty acid and an alkaline earth metal salt of a fatty acid, more preferably an alkaline earth metal salt of a fatty acid. Above all, preferred are an alkali metal salt and an alkaline earth metal salt of stearic acid, and more preferred is an alkaline earth metal salt of stearic acid. The present invention also relates to a deoxidant pack for high-humidity use fabricated by wrapping the above-mentioned deoxidant composition with a vapor-pervious wrapping material, not adding an inorganic filler thereto, and to a method of deoxidating the inside of a gas-barrier container under a high humidity condition of from 70 to 100% RH (relative humidity) by the use of the deoxidant pack.

The deoxidant composition of the present invention may preserve the oxygen absorption potency in high-humidity conditions even though an inorganic filler is not added thereto, and therefore it may preserve the oxygen absorption potency even when used in saturated or nearly saturated high-humidity atmospheres of from 70 to 100% RH. In addition, since an inorganic filler may not be added thereto, the apparent volume to be used of the deoxidant composition per the oxygen absorption rate does not increase.

The deoxidant pack of the present invention may be compacted, may exhibit the oxygen absorption potency for a long period of time even in high-humidity conditions, and may preserve medicines, foods and others for a long period of time. It may exhibit the oxygen absorption potency in high-humidity conditions even though an inorganic filler is not incorporated thereinto. Since the incorporation of an inorganic filler may be omitted, the apparent volume of the deoxidant composition may be smaller than the apparent volume of the conventional deoxidant composition (with an inorganic filler incorporated therein) that exhibits the same oxygen absorption rate, and as a result, the amount of the wrapping material to be used in forming the deoxidant pack may be reduced.

BEST MODE FOR CARRYING OUT THE INVENTION

The method of the present invention is described in detail hereinafter.

Not specifically defined, the iron powder to be the main ingredient of the deoxidant may be any one with unoxidized iron exposed out on the surface thereof; and reduced iron powder, electrolytic iron powder, spray iron powder and the like are preferably used. In addition, also usable are ground product and cut product of cast iron or the like. For improving its contact with oxygen, the iron powder for use herein may have a mean particle size of generally at most 1 mm, preferably at most 500 μm, more preferably at most 100 μm.

The metal halide is an oxidation promoter for promoting the oxidation of the iron powder, and is preferably an alkali metal or alkaline earth metal halide, such as sodium chloride, calcium chloride, magnesium chloride, sodium bromide, calcium bromide, etc.

The amount of the metal halide to be used relative to the iron powder may be within a range of from 0.01 to 20 parts by weight relative to 100 parts by weight of the iron powder.

In general, when a deoxidant pack is used in high-humidity conditions, there occurs moisture transfer of water vapor penetration into the inside of the deoxidant pack through the vapor-pervious wrapping material (wrapper) of the deoxidant pack, whereby the surface of the iron powder is covered with moisture and its oxygen absorption potency is lowered. In the present invention, however, a water repellent is added and therefore the transferred moisture is repelled from the iron powder surface, thereby forming water droplets, and accordingly, the moisture is prevented from spreading on the deoxidant surface and the deoxidant potency may be thereby prevented from lowering.

The water repellent to be added for the purpose of improving the deoxidation potency preservability is a substance having a water-repellent function, and is especially preferably a metal soap.

The metal soap is preferably a metal salt of a fatty acid, rosin acid or naphthenic acid. The fatty acid for the metal soap includes butyric acid, caproic acid, caprylic acid, capric acid, lauric acid, myristic acid, palmitic acid and stearic acid, and is preferably stearic acid. Concretely, the salt includes barium stearate, potassium stearate, sodium stearate, calcium stearate, zinc stearate, aluminum stearate, magnesium stearate. The metal to form the salt is preferably an alkali metal or an alkaline earth metal, more preferably an alkali metal salt of a fatty acid or an alkaline earth metal salt of a fatty acid. Especially preferred are an alkali metal stearate and an alkaline earth metal stearate. Of those, an alkaline earth metal stearate such as calcium stearate and magnesium stearate is more preferred as its potency preservability-improving effect is great and its safety is high when added. These may be used either singly or as combined.

The water repellent may be suitably selected, depending on the type of the water repellent to be used, the period of time for its application, and the moisture content of the object to be preserved by its application, but when its amount is too small, then the effect may be poor; and accordingly, the amount may be from 0.01 to 5 parts by weight, preferably from 0.05 to 1 part by weight relative to 100 parts by weight of the iron powder. In case where the amount is too large, then it is unfavorable since the iron powder could not effectively utilize moisture necessary for deoxidation and the oxygen absorption rate may be thereby lowered and the cost may increase.

As in the above, the deoxidant composition of the present invention essentially comprises an iron powder of the main ingredient, a metal halide of an oxidation promoter, and a water repellent. The iron powder, the metal halide and the water repellent are wrapped with a vapor-pervious wrapping material in the form of their composition. For example, according to a method of mechanically mixing an iron powder, a metal halide and a water repellent, or a method comprising adhering a metal halide to an iron powder followed by mixing a water repellent with it, or a method of adhering a metal halide and a water repellent to an iron powder or the like, the composition may be produced according to such a method of finally fully mixing an iron powder, a metal halide and a water repellent.

In addition to the above-mentioned iron powder and metal halide, additives may be optionally added to the deoxidant composition of the present invention within a range not detracting from the effect of the present invention. For example, for the purpose of deodorization, dusting inhibition, microwave resistance and hydrogen generation inhibition, silica, alumina, activated carbon, sodium bicarbonate or the like may be suitably added.

However, when these additives are added, then the size of the deoxidant pack per the oxygen absorption potency thereof may increase and the amount of the vapor-pervious wrapping material to constitute the deoxidant pack may thereby increase; and accordingly, the amount of the additives should be the minimum. The overall amount of the additives may be preferably from 0 to 35 parts by weight relative to 100 parts by weight of the total amount of the iron powder and the metal halide, more preferably from 0 to 25 parts by weight.

For use in high-humidity conditions, an inorganic filler such as silica or alumina is added to conventional deoxidant compositions for the purpose of preserving the oxygen absorption potency thereof. In the present invention, however, even for use in high-humidity conditions, the deoxidant may preserve its oxygen absorption potency, and therefore adding an inorganic filler such as silica or alumina thereto may be omitted, and the apparent volume of the deoxidant composition per the oxygen absorption rate may be reduced.

The deoxidant composition of the present invention may be wrapped with a vapor-pervious wrapping material, as partially or wholly filled up therein, and may be used as a deoxidant pack. The vapor-pervious wrapping material to be used for it is preferably a wrapping material having vapor permeability as high as possible in order that the deoxidant may fully exhibit its oxygen-absorbing effect. For example, there may be mentioned paper materials such as Japanese paper, western paper, rayon paper; nonwoven fabrics of various fibers, for example, fibers of pulp, cellulose or synthetic resin; plastic films or their perforated ones; microporous films prepared by adding calcium carbonate followed by stretching; laminate of two or more selected from those mentioned above. As the vapor-pervious wrapping material, preferred are nonwoven fabrics made of polyethylene, or laminates of nonwoven fabric and microporous film.

Not adding an inorganic filler thereto, the deoxidant composition of the present invention may be wrapped with a vapor-pervious wrapping material to be a deoxidant pack for high-humidity use. The deoxidant pack of the type may be used for good deoxidation in the space inside a gas-barrier container in high-humidity conditions of from 70 to 100% RH, especially in saturated or nearly saturated high-humidity conditions.

The deoxidant composition of the present invention, or the deoxidant pack of the present invention fabricated by filling up and wrapping the deoxidant composition with a vapor-pervious wrapping material may be used, as sealed up in a gas-barrier container along with a preserved object to be put therein. Regarding the shape and the material thereof, the gas-barrier container to be used may be any one capable of being sealed up and substantially having gas-barrier capability; and not specifically defined, it includes, for example, metal cans, glass bottles, plastic vessels, bags, etc. Simply usable herein are packing containers and bags of a laminate having an oxygen permeability of from 0.05 to 20 ml/m$^2$·24-hr·atm (25° C., 50% RH), for example, a multilayer sheet or film such as typically polyethylene terephthalate/aluminum deposit/polyethylene, stretched polypropylene/polyvinyl alcohol/polyethylene, or polyvinylidene chloride-coated stretched nylon/polyethylene, or a coextruded, nylon-based multilayer sheet or film.

The deoxidant composition of the present invention may favorably remove oxygen even in high-humidity conditions of from 70 to 100% RH. In particular, the deoxidant composition of the present invention is favorable for applications that require moisture resistance. For example, it is favorable for long-term preservation of foods such as rice cakes, cooked rice, ham, side dishes, etc.

EXAMPLES

The present invention is described more concretely with reference to the following Examples. However, the present invention should not be limited to these Examples.

Example 1

0.5 g of calcium chloride was dissolved in 7 ml of water, and the aqueous solution was added to 100 g of iron powder (mean particle size, 50 μm) with mixing, and dried to obtain an iron powder with calcium chloride adhering thereto; and 0.2 g of calcium stearate powder (by Sakai Chemical Industry, content of particles having a particle size of at most 75 μm, 99 wt. %) was added to it and fully mixed to prepare a deoxidant composition. 1.80 g of the obtained deoxidant composition was filled in a rectangular pouch formed of a vapor-impervious laminate film of PET/LLDPE/EVA on one side and a vapor-pervious laminate film of a polyethylene nonwoven fabric on the other side and having a vapor-pervious area of 40 mm (long side)×37 mm (narrow side), by sealing it at four sides thereof, thereby producing a deoxidant pack.

The deoxidant pack was processed for water transfer to the deoxidant in a high-humidity environment, and after the treatment, it was evaluated for the oxygen absorption potency preservability thereof to thereby evaluate the potency preservability of the deoxidant.

Wetted cotton for humidification prepared by infiltrating 10 ml of water thereinto, and the above-mentioned deoxidant pack were put into a gas-barrier bag of 130 mm×140 mm (laminate film of polyvinylidene chloride-coated stretched nylon/polyethylene), in which the two was kept separated by a resin net put therebetween; and the bag was sealed up with 5 ml of air put therein. The thus-sealed bag (hereinafter referred to as "water-transferring bag") was stored in a thermostat bath at 35° C. for 5 days, 7 days or 9 days, whereby moisture was transferred to the deoxidant under the saturated humidity condition. The sealed water-transferred bag was opened, and the water-transferred deoxidant pack was taken out, and this was sealed up in a different gas-barrier bag along with 500 ml of a mixed gas of oxygen and nitrogen having a controlled oxygen concentration of 2%, put thereinto, and left in a thermostat bath at 5° C. After 24 hours, the oxygen concentration in the gas-barrier bag (hereinafter referred to as sealed gas-barrier bag) was measured, from which the oxygen absorption potency preservability under the saturated humidity condition of the deoxidant pack before and after the water transfer treatment test was evaluated. The results are shown in Table 1. The deoxidant of the present invention all the time attained complete deoxidation within 24 hours (the oxygen concentration in the sealed gas-barrier bag, at most 0.01%) even after left in the high-humidity atmosphere for 5 days or more, and this confirmed the oxygen absorption potency preservability of the deoxidant.

When a small amount of water was dropped onto the surface of the prepared deoxidant composition, then the dropped water was observed to form water droplets.

Examples 2 to 5

Deoxidants and deoxidant packs were produced in the same manner as in Example 1, for which, however, calcium stearate used in Example 1 was changed to magnesium stearate, barium stearate, potassium palmitate and sodium laurate, respectively. The produced deoxidant packs were tested in the same manner as in Example 1 to evaluate the oxygen absorption potency preservability. The results are shown in Table 1. The deoxidants of the present invention all the time attained complete deoxidation within 24 hours (the oxygen concentration in the sealed gas-barrier bag, at most 0.01%) even after left in the high-humidity atmosphere for 5 days or more, and this confirmed the oxygen absorption potency preservability of the deoxidants.

When a small amount of water was dropped onto the surface of the prepared deoxidant compositions in the same manner as in Example 1, then the dropped water was observed to form water droplets in every case.

Examples 6 to 8

Deoxidants and deoxidant packs were produced in the same manner as in Example 1, for which, however, calcium chloride used in Example 1 was changed to the same amount of calcium bromide and the amount of calcium stearate was changed to 0.05 g, 0.5 g or 1.0 g. The produced deoxidant packs were tested in the same manner as in Example 1 to evaluate the oxygen absorption potency preservability. The results are shown in Table 1. The deoxidants of the present invention all the time attained complete deoxidation within 24 hours (the oxygen concentration in the sealed gas-barrier bag, at most 0.01%) even after left in the high-humidity atmosphere for 5 days or more, and this confirmed the oxygen absorption potency preservability of the deoxidants.

When a small amount of water was dropped onto the surface of the prepared deoxidant compositions in the same manner as in Example 1, then the dropped water was observed to form water droplets.

Comparative Example 1

A deoxidant and a deoxidant pack were produced in the same manner as in Example 1, for which, however, calcium stearate used in Example 1 was not used. The produced deoxidant pack was tested in the same manner as in Example 1 to evaluate the oxygen absorption potency preservability. The results are shown in Table 1. After a period of water transfer treatment of 7 days or more, the oxygen absorption potency of the deoxidant pack lowered.

When a small amount of water was dropped onto the surface of the prepared deoxidant composition in the same manner as in Example 1, then the dropped water was observed to directly penetrate and spread inside the deoxidant composition.

TABLE 1

Oxygen Absorption Potency Preservability[1)] of Deoxidant after water transfer treatment in high-humidity atmosphere

|  | Example 1 | Example 2 | Example 3 | Example 4 | Example 5 | Example 6 | Example 7 | Example 8 | Comparative Example 1 |
|---|---|---|---|---|---|---|---|---|---|
| Water Repellent | Ca stearate | Mg stearate | Ba stearate | K palmitate | Na laurate | Ca stearate | Ca stearate | Ca stearate | not added |
| Amount of Water Repellent[*2)] | 0.2 g | 0.2 g | 0.2 g | 0.2 g | 0.2 g | 0.05 g | 0.5 g | 1.0 g | no |
| Metal Halide | $CaCl_2$ | $CaCl_2$ | $CaCl_2$ | $CaCl_2$ | $CaCl_2$ | $CaBr_2$ | $CaBr_2$ | $CaBr_2$ | $CaCl_2$ |
| Water Transfer 5 days | at most 0.01% | at most 0.01% | at most 0.01% | at most 0.01% | at most 0.01% | at most 0.01% | at most 0.01% | at most 0.01% | 0.06% |

TABLE 1-continued

Oxygen Absorption Potency Preservability[*1)] of Deoxidant after water transfer treatment in high-humidity atmosphere

| | | Example 1 | Example 2 | Example 3 | Example 4 | Example 5 | Example 6 | Example 7 | Example 8 | Comparative Example 1 |
|---|---|---|---|---|---|---|---|---|---|---|
| Treatment[*3)] | 7 days | at most 0.01% | at most 0.01% | at most 0.01% | at most 0.01% | at most 0.01% | at most 0.01% | at most 0.01% | at most 0.01% | 0.63% |
| | 9 days | at most 0.01% | at most 0.01% | at most 0.01% | at most 0.01% | at most 0.01% | at most 0.01% | at most 0.01% | at most 0.01% | 1.41% |

[*1)]oxygen concentration (% by volume) in gas-barrier bag filled and sealed up with 500 ml of 2% oxygen-controlled gas, after 24 hours at 5° C.
[*2)]amount relative to 100 g of iron powder.
[*3)]period for leaving in water transfer test bag at saturated humidity.

Example 9

A mounting test is conducted as follows.

One deoxidant pack produced in the same manner as in Example 1 was directly put on 1050 g of boiled rice put in a gas-barrier bag (polyvinylidene-coated stretched nylon/polyethylene laminate film) of 220 mm×330 mm, and this was sealed up. The sealed container was stored at 25° C. for 30 days, and then the oxygen concentration in the sealed container was measured, and it was less than 0.1%, and the taste of the boiled rice was good. The deoxidant pack was taken out and checked, and no rust was seen. No abnormality of the outward appearance was seen in the part of the boiled rice kept in contact with the deoxidant pack; and in a test according to a potassium thiocyanate method, no iron reaction was detected.

Industrial Applicability

The deoxidant composition of the present invention may preserve its oxygen absorption potency in high-humidity conditions even though an inorganic filler is not added thereto; and when used in a high-humidity atmosphere at 70 to 100% RH or so, it may preserve its oxygen absorption potency. In addition, since an inorganic filler may not be added thereto, the apparent volume to be used of the deoxidant composition per the oxygen absorption rate is small.

The deoxidant pack of the present invention may be compacted, may exhibit the oxygen absorption potency for a long period of time even in high-humidity conditions, and may preserve medicines, foods and others for a long period of time. It may exhibit the oxygen absorption potency in high-humidity conditions even though an inorganic filler is not incorporated thereinto, and its apparent volume may be reduced more than the conventional deoxidant composition with an inorganic filler incorporated therein. As a result, the amount of the wrapping material to be used in forming the deoxidant pack may be reduced.

The invention claimed is:

1. A deoxidant composition comprising 100 parts by weight of an iron powder, from 0.01 to 20 parts by weight of a metal halide and from 0.01 to 5 parts by weight of a water repellent, wherein the water repellent is a metal soap, and the metal soap is an alkali metal salt or alkaline earth metal salt of a fatty acid, and the deoxidant composition does not include an inorganic filler added thereto.

2. The deoxidant composition as claimed in claim 1, wherein the metal soap is selected from the group consisting of calcium stearate and magnesium stearate.

3. A deoxidant pack for high-humidity use, fabricated by wrapping a deoxidant composition with a gas-pervious wrapping material, the deoxidant composition comprising 100 parts by weight of an iron powder, from 0.01 to 20 parts by weight of a metal halide and from 0.01 to 5 parts by weight of a water repellent, wherein the water repellent is a metal soap, and the metal soap is an alkali metal salt or alkaline earth metal salt of a fatty acid, and the deoxidant composition does not include inorganic filler added thereto.

4. A method of deoxidating the space inside a gas-barrier container under a high humidity condition of from 70 to 100% relative humidity by adding the deoxidant pack of claim 1 to said container.

5. The deoxidant pack for high-humidity use as claimed in claim 1, wherein the metal soap is an alkali metal salt or alkaline earth metal salt of stearic acid.

6. The deoxidant pack for high-humidity use as claimed in claim 1, wherein the metal soap is an alkaline earth metal salt of stearic acid.

7. The deoxidant pack for high-humidity use as claimed in claim 1, wherein the metal soap is selected from the group consisting of calcium stearate and magnesium stearate.

8. The deoxidant pack for high-humidity use as claimed in claim 1, wherein the deoxidant composition includes from 0.05 to 1 part by weight of the water repellent.

* * * * *